United States Patent
Kadokura

(10) Patent No.: US 10,315,262 B2
(45) Date of Patent: Jun. 11, 2019

(54) WIRE ELECTRODE STORAGE DEVICE FOR WIRE ELECTRICAL DISCHARGE MACHINE

(71) Applicant: FANUC Corporation, Yamanashi (JP)

(72) Inventor: Hiromitsu Kadokura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 244 days.

(21) Appl. No.: 15/381,648

(22) Filed: Dec. 16, 2016

(65) Prior Publication Data

US 2017/0182574 A1 Jun. 29, 2017

(30) Foreign Application Priority Data

Dec. 25, 2015 (JP) ................. 2015-252841

(51) Int. Cl.
| | | |
|---|---|---|
| *B23H 7/10* | (2006.01) | |
| *B23H 1/10* | (2006.01) | |
| *B23Q 11/00* | (2006.01) | |
| *B23H 7/36* | (2006.01) | |

(52) U.S. Cl.
CPC ............ *B23H 7/108* (2013.01); *B23H 1/10* (2013.01); *B23H 7/101* (2013.01); *B23Q 11/0067* (2013.01); *B23H 7/36* (2013.01)

(58) Field of Classification Search
CPC . B23H 7/108; B23H 1/10; B23H 7/36; B23H 7/101; B23Q 11/0067
USPC ...................................... 137/205.5
See application file for complete search history.

(56) References Cited

U.S. PATENT DOCUMENTS

| | | | |
|---|---|---|---|
| 1,957,667 A | | 5/1934 | Ritter et al. |
| 3,333,601 A | * | 8/1967 | Lofgreen ............... B01F 5/04 137/607 |
| 3,384,909 A | * | 5/1968 | Scott ................... D06F 33/10 134/56 D |
| 3,756,220 A | * | 9/1973 | Tehrani ................ E04H 4/129 126/374.1 |
| 3,820,627 A | | 6/1974 | Wirt |
| 5,073,691 A | * | 12/1991 | Magara ................ B23H 7/10 219/69.12 |
| 5,874,702 A | * | 2/1999 | Hayakawa ............ B23H 1/10 219/69.12 |

(Continued)

FOREIGN PATENT DOCUMENTS

| | | |
|---|---|---|
| JP | S63123633 A | 5/1988 |
| JP | 1-020929 A * | 1/1989 |

(Continued)

OTHER PUBLICATIONS

Machine translation of Japan Utility Patent document No. 4-110,760, Oct. 2018.*

(Continued)

*Primary Examiner* — Geoffrey S Evans

(74) *Attorney, Agent, or Firm* — Hauptman Ham, LLP

(57) ABSTRACT

A wire electrode storage device for a wire electrical discharge machine is provided with a used wire electrode storage box configured to recover a used wire electrode and a dielectric fluid suction unit into which a fluid is poured to produce a negative pressure based on a Venturi effect so that a dielectric fluid accumulated in the storage box can be drawn in through an outlet of the storage box.

14 Claims, 4 Drawing Sheets

(56) References Cited

U.S. PATENT DOCUMENTS

| | | | | |
|---|---|---|---|---|
| 2002/0170864 A1* | 11/2002 | Batten | ................... | B01D 17/00 |
| | | | | 210/803 |
| 2007/0278190 A1* | 12/2007 | Kita | ........................ | B23H 1/10 |
| | | | | 219/69.12 |
| 2008/0160363 A1* | 7/2008 | Tsukada | ............ | H01M 8/04097 |
| | | | | 429/414 |
| 2013/0199987 A1 | 8/2013 | Morris et al. | | |

FOREIGN PATENT DOCUMENTS

| | | | |
|---|---|---|---|
| JP | S6420929 A | | 1/1989 |
| JP | 4-110760 U | | 9/1992 |
| JP | 4-300122 A | * | 10/1992 |
| JP | 6-063824 A | * | 3/1994 |
| JP | 6-63824 A | | 3/1994 |
| JP | 9-216130 A | * | 8/1997 |

OTHER PUBLICATIONS

Extended European Search Report in EP Application No. 16202051.5, dated May 19, 2017.
Office Action in JP Application No. 2015-252841, dated Dec. 12, 2017, 6pp.

* cited by examiner

WIRE ELECTRODE STORAGE DEVICE FOR WIRE ELECTRICAL DISCHARGE MACHINE

RELATED APPLICATIONS

The present application claims priority to Japanese Patent Application Number 2015-252841, filed Dec. 25, 2015, the disclosure of which is hereby incorporated by reference herein in its entirety.

FIELD OF THE INVENTION

The present invention relates to a used wire electrode recovery device for a wire electrical discharge machine.

DESCRIPTION OF THE RELATED ART

A wire electrical discharge machine usually comprises a used wire electrode storage box. A dielectric fluid used as a wire electrode conveying means, as well a used wire electrode, is accumulated in the used wire electrode storage box. The accumulated dielectric fluid must be periodically discharged. Moreover, the dielectric fluid accumulated in the used wire electrode storage box may possibly catch fire if it is oil.

FIG. 5 is a diagram showing a wire electrical discharge machine and a used wire electrode storage box according to a prior art.

A used wire electrode 3 is discharged from a wire outlet in the main body of a wire electrical discharge machine 16 by pinch rollers 2 and accumulated in a used wire electrode storage box 4. As this is done, a dielectric fluid 5 for use as a wire electrode conveying means is also accumulated, along with the used wire electrode 3, in the storage box 4. The dielectric fluid 5 accumulated in the used wire electrode storage box 4 is discharged by opening and closing a valve 6 attached to the bottom part of the storage box 4.

Japanese Patent Application Laid-Open No. 63-123633 discloses a technique for the storage of a used wire electrode. In this technique, as shown in FIG. 6, a liquid-permeable net member 7 is stretched at a lower part of a used wire electrode storage box 4 so that a dielectric fluid 5 having dropped through the net member 7 can be received by a dielectric fluid receiving unit 10. However, according to this technique, although a used wire electrode 3 can be collected separately from the dielectric fluid 5, the separated dielectric fluid 5 must be discharged by human power.

On the other hand, as shown in FIG. 7, Japanese Patent Application Laid-Open No. 64-20929 discloses a technique in which a liquid-permeable net member 7 is stretched at a lower part of a used wire electrode storage box 4 so that a dielectric fluid 5 having dropped through the net member 7 can be received by a dielectric fluid receiving unit 10, and moreover, the dielectric fluid 5 received by the dielectric fluid receiving unit 10 is discharged into a dielectric fluid tank 8 by operating a pump 9. The used wire electrode storage box 4 (dielectric fluid receiving unit 10) and the dielectric fluid tank 8 are connected by the pump 9. If the pump 9 is continually operated, however, it may possibly idle. Therefore, as shown in FIG. 7, sensors 11a and 11b are provided on upper and lower parts, respectively, of the used wire electrode storage box 4, and it is determined based on signals from the sensors 11a and 11b whether or not the dielectric fluid is accumulated in the dielectric fluid receiving unit 10. A controller 12 controls the operation of the pump 9 so that the pump 9 operates when the dielectric fluid 5 is accumulated in the dielectric fluid receiving unit 10.

Although the dielectric fluid need not be discharged by human power in the technique disclosed in Japanese Patent Application Laid-Open No. 64-20929, however, there is a need of providing the dedicated pump 9 and the dedicated sensors 11a and 11b, thus resulting in a considerable increase in cost. Moreover, both of the prior art techniques described above involve a problem that the dielectric fluid received in the used wire electrode storage box (dielectric fluid receiving unit) continues to be accumulated in the storage box until the operation for the dielectric fluid discharge is performed, so that a fire may possibly be caused if oil is used as the dielectric fluid.

SUMMARY OF THE INVENTION

Accordingly, the object of the present invention is to provide a wire electrode storage device for a wire electrical discharge machine capable of suitably discharging a dielectric fluid accumulated in a used wire electrode storage box at low cost without providing a dedicated pump or sensor.

A wire electrode storage device for a wire electrical discharge machine according to the present invention includes a used wire electrode storage box configured to recover a used wire electrode. The used wire electrode storage box has an outlet through which a dielectric fluid accumulated therein is discharged to the outside. Furthermore The wire electrode storage device comprises a dielectric fluid suction unit into which a fluid is poured to produce a negative pressure based on a Venturi effect so that the dielectric fluid is enabled to be drawn in through the outlet of the used wire electrode storage box under the produced negative pressure.

The used wire electrode storage box may include an mechanism for collecting the dielectric fluid around the outlet. The mechanism for collecting the dielectric fluid may be a depression provided around the outlet of the used wire electrode storage box or a member for inclining a bottom surface of the used wire electrode storage device so that the dielectric fluid flows to the outlet.

The wire electrode storage device may be configured so that the dielectric fluid drawn in by the dielectric fluid suction unit is recovered into a dielectric fluid tank.

The fluid poured into the dielectric fluid suction unit may be the dielectric fluid drawn up by a pump attached to the dielectric fluid tank.

According to the present invention, a dielectric fluid accumulated in a used wire electrode storage device can be constantly discharged by a low-priced mechanism that utilizes an existing pump or the like, without newly providing any component such as a dedicated pump or sensor, whereby accumulation of a dielectric fluid such as oil that may cause a fire can be prevented.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
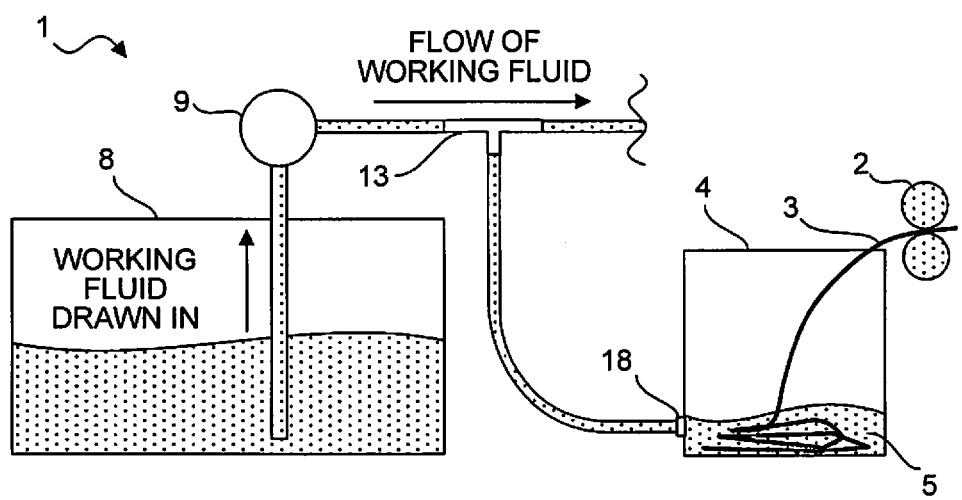
FIG. 1 is a schematic configuration diagram of a used wire electrode storage device for a wire electrical discharge machine according to one embodiment of the present invention.

A wire electrode storage device for a wire electrical discharge machine according to one embodiment of the present invention will be described with reference to FIG. 1.

A wire electrode storage device 1 comprises a dielectric fluid suction unit 13 such as an eductor provided with a fluid suction system based on the Venturi effect. The dielectric fluid suction unit 13 is connected to a pump 9 attached to a dielectric fluid tank 8 and an outlet 18 in a used wire electrode storage box 4. The dielectric fluid suction unit 13 will hereinafter be referred to as the eductor 13.

The eductor 13 sucks up a dielectric fluid 5 in the used wire electrode storage box 4 by means of a flow of the dielectric fluid drawn from the dielectric fluid tank 8 by the pump 9. The dielectric fluid 5 in the used wire electrode storage box 4 sucked up by the eductor 13, along with the dielectric fluid drawn from the dielectric fluid tank 8, is recovered into a machining tank of a wire electrical discharge machine 16 or some other dielectric fluid tank (neither of which is shown).

The pump 9 connected to the eductor 13 should only be a pump configured to draw in the dielectric fluid and may be a built-in pump for the wire electrical discharge machine. Also, the dielectric fluid 5 can always be drawn from the used wire electrode storage box 4 by using a continually-operated pump as the pump 9.

Thus, the amount of the dielectric fluid 5 accumulated in the used wire electrode storage box 4 can be minimized, and moreover, the safety can be improved if oil is used as the dielectric fluid. Furthermore, a flow from the pump already used in the wire electrical discharge machine can be used to discharge the dielectric fluid 5 accumulated in the used wire electrode storage box 4, so that there is no need of an additional (or dedicated) pump for the discharge of the dielectric fluid 5.

Figure 2:
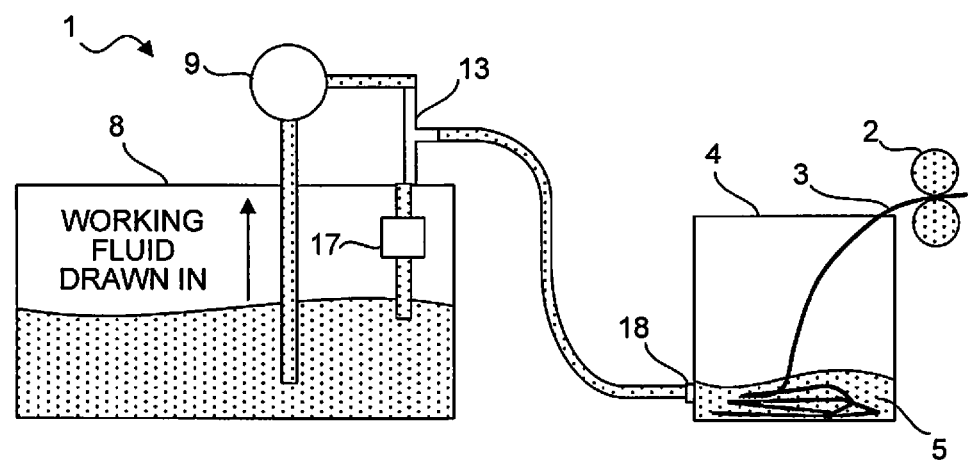
FIG. 2 is a schematic configuration diagram of a used wire electrode storage device for a wire electrical discharge machine according to another embodiment of the present invention.

A wire electrode storage device for a wire electrical discharge machine according to another embodiment of the present invention will be described with reference to FIG. 2.

A dielectric fluid 5 drawn from a used wire electrode storage box 4 by means of the Venturi effect of an eductor 13 may be used for a sealing mechanism (not shown) for a machining tank of a wire electrical discharge machine body. Moreover, since impurities such as wire scraps may possibly be mixed into the drawn dielectric fluid 5, they may be returned to a dielectric fluid tank 8 through a filter 17 for cleaning the dielectric fluid in the dielectric fluid tank 8, as shown in FIG. 2, without being allowed to flow into the wire electrical discharge machine body. In this case, the eductor 13 is connected to a duct furnished with the filter 17.

With the above configuration, the dielectric fluid can be recovered from the used wire electrode storage box 4 at low cost.

Figure 3:
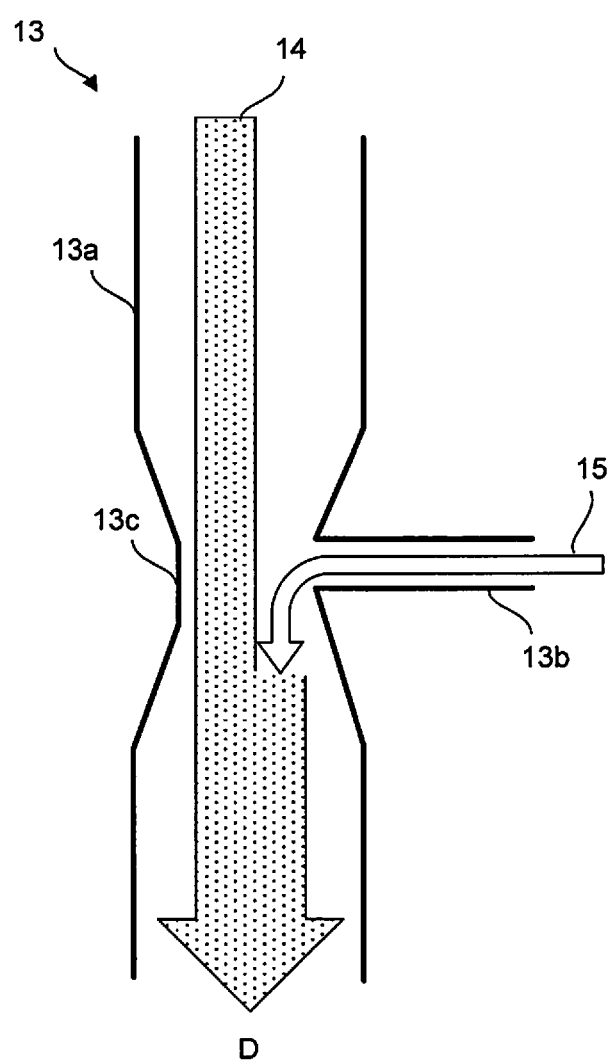
FIG. 3 is a diagram illustrating an example of the structure of an eductor used in the wire electrode storage devices of FIGS. 1 and 2.

An example of the structure of the eductor 13 used in the wire electrode storage devices of FIGS. 1 and 2 will be described with reference to FIG. 3.

The eductor 13 comprises a main pipe 13a and a suction pipe 13b. The thickness (diameter) of the main pipe 13a is not uniform and part of the main pipe 13a forms a narrow constricted portion 13c. Moreover, the suction pipe 13b is connected to the constricted portion 13c. The dielectric fluid in the duct including the main pipe 13a is caused to flow as a drive fluid 14 into the eductor 13 by the suction force of a pump 9, which is connected to one end of the main pipe 13a, flow in the direction of arrow D, and pass through the constricted portion 13c. Thereupon, the pressure in the constricted portion 13c becomes lower than that in any other part of the main pipe 13a due to the Venturi effect, so that a suction fluid 15 can be drawn from the suction pipe 13b that is connected to the constricted portion 13c.

The suction pipe 13b may be provided with a check valve or the like for restraining the drive fluid 14 from flowing back from the main pipe 13a toward the suction pipe 13b. Moreover, the drive fluid 14 may be either a liquid, such as water or oil, or a gas, such as compression air.

Figure 4A:
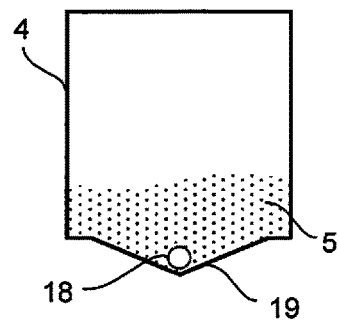
FIGS. 4A, 4B and 4C are diagrams individually showing modifications of used wire electrode storage boxes of FIGS. 1 and 2.
Figure 4B:
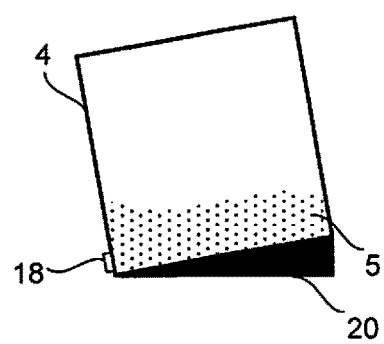
Figure 4C:
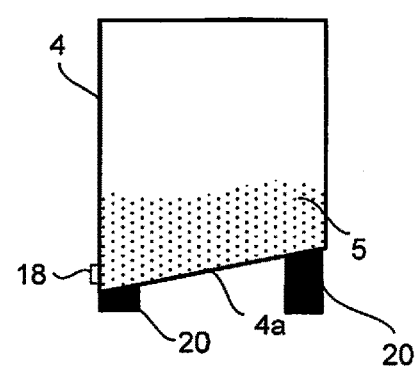
Figure 5:
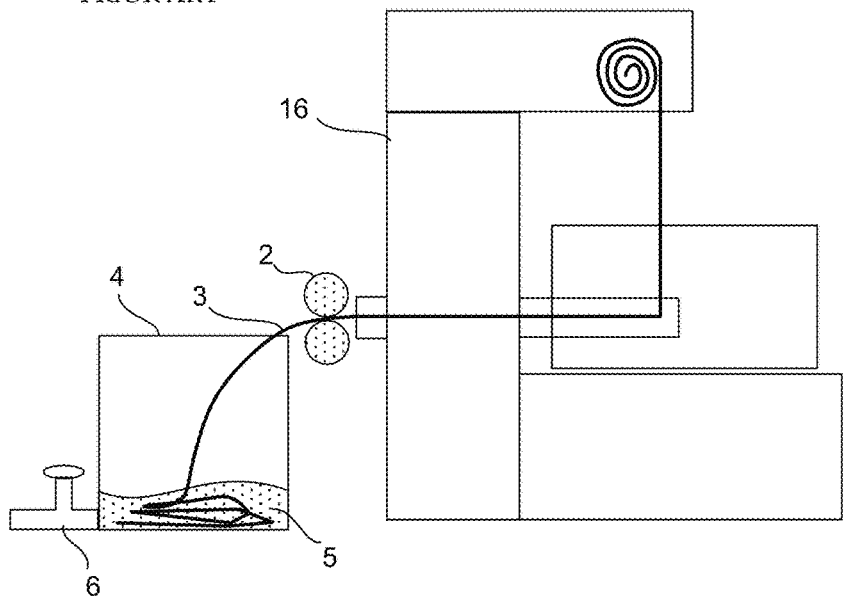
FIG. 5 is a diagram showing examples of a wire electrical discharge machine and a used wire electrode storage box according to a prior art.
Figure 6:
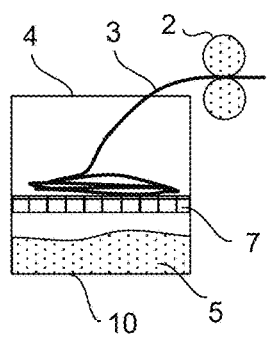
FIG. 6 is a diagram showing an example of the used wire electrode storage box according to the prior art.
Figure 7:
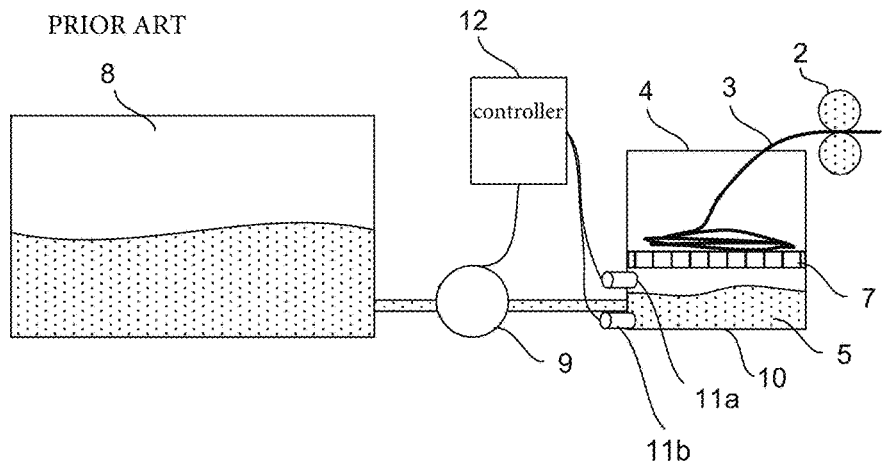
FIG. 7 is a diagram showing an example of a wire electrode storage device according to the prior art.

Furthermore, in order to recover the dielectric fluid 5 more efficiently from the used wire electrode storage box 4, a net member may be installed in the storage box 4, as in the prior art disclosed in Japanese Patent Application Laid-Open No. 63-123633, or the storage box 4 may be provided with a mechanism for collecting the dielectric fluid 5 in one place. For example, a depression 19 may be provided around the outlet 18 of the used wire electrode storage box 4, as shown in FIG. 4A, or an inclining member 20 may be additionally provided under the storage box 4 so that the entire storage box 4 is declined toward the outlet 18, as shown in FIG. 4B. Alternatively, as shown in FIG. 4C, a slope portion 4a declining toward the outlet 18 may be provided only on the bottom surface of the used wire electrode storage box 4 so as to be supported by inclining members 20.

While embodiments of the present invention have been described herein, the invention is not limited to the above-described embodiments and may be suitably modified and embodied in various forms.

The invention claimed is:

1. A wire electrode storage device for a wire electrical discharge machine, the wire electrode storage device comprising:
    a used wire electrode storage box configured to recover a used wire electrode, wherein the used wire electrode storage box has an outlet through which a dielectric fluid accumulated therein is discharged to an outside;
    a dielectric fluid tank configured to store the dielectric fluid;
    a pump attached to the dielectric fluid tank; and
    a dielectric fluid suction unit, wherein
    when a flow of the dielectric fluid is drawn from the dielectric fluid tank by the pump into the dielectric fluid suction unit, the dielectric fluid suction unit is configured to produce a negative pressure based on a Venturi effect to cause the dielectric fluid in the used wire electrode storage box to be drawn under the produced negative pressure into the dielectric fluid suction unit through the outlet of the used wire electrode storage box.

2. The wire electrode storage device according to claim 1, wherein the used wire electrode storage box includes a mechanism for collecting the dielectric fluid around the outlet.

3. The wire electrode storage device according to claim 2, wherein the mechanism for collecting the dielectric fluid is a depression provided around the outlet of the used wire electrode storage box.

4. The wire electrode storage device according to claim 2, wherein the mechanism for collecting the dielectric fluid is a member for inclining a bottom surface of the used wire electrode storage box to cause the dielectric fluid to flow to the outlet.

5. The wire electrode storage device according to claim 1, wherein the dielectric fluid suction unit is configured to cause the dielectric fluid drawn out from the used wire electrode storage box to be recovered into the dielectric fluid tank.

6. The wire electrode storage device according to claim 1, wherein the dielectric fluid suction unit includes:
   a main pipe having
      opposite ends one of which is connected to the pump, and
      a constricted portion between the opposite ends, and
   a suction pipe connecting the constricted portion of the main pipe to the outlet of the used wire electrode storage box.

7. The wire electrode storage device according to claim 1, wherein the dielectric fluid suction unit is configured to cause the dielectric fluid sucked up from the used wire electrode storage box, along with the dielectric fluid drawn by the pump from the dielectric fluid tank, to be returned to the dielectric fluid tank.

8. A wire electrical discharge machine, comprising:
   a used wire electrode storage box configured to recover a used wire electrode, wherein the used wire electrode storage box has an outlet through which a dielectric fluid accumulated therein is discharged to an outside;
   a dielectric fluid tank configured to store the dielectric fluid;
   a pump attached to the dielectric fluid tank; and
   a dielectric fluid suction unit,
   wherein
      when a flow of the dielectric fluid is drawn from the dielectric fluid tank by the pump into the dielectric fluid suction unit, the dielectric fluid suction unit is configured to produce a negative pressure based on a Venturi effect to cause the dielectric fluid in the used wire electrode storage box to be drawn under the produced negative pressure into the dielectric fluid suction unit through the outlet of the used wire electrode storage box.

9. The wire electrical discharge machine according to claim 8, wherein the used wire electrode storage box includes a mechanism for collecting the dielectric fluid around the outlet.

10. The wire electrical discharge machine according to claim 9, wherein the mechanism for collecting the dielectric fluid is a depression provided around the outlet of the used wire electrode storage box.

11. The wire electrical discharge machine according to claim 9, wherein the mechanism for collecting the dielectric fluid is a member for inclining a bottom surface of the used wire electrode storage box to cause the dielectric fluid to flow to the outlet.

12. The wire electrical discharge machine according to claim 8, wherein the dielectric fluid suction unit is configured to cause the dielectric fluid drawn out from the used wire electrode storage box to be recovered into the dielectric fluid tank.

13. The wire electrical discharge machine according to claim 8, wherein the dielectric fluid suction unit includes:
   a main pipe having
      opposite ends one of which is connected to the pump, and
      a constricted portion between the opposite ends, and
   a suction pipe connecting the constricted portion of the main pipe to the outlet of the used wire electrode storage box.

14. The wire electrical discharge machine according to claim 13, wherein the other of the opposite ends of the main pipe is connected to the dielectric fluid tank to cause the dielectric fluid sucked up from the used wire electrode storage box, along with the dielectric fluid drawn by the pump from the dielectric fluid tank, to be returned to the dielectric fluid tank.

* * * * *